United States Patent [19]

Katakura

[11] Patent Number: 5,268,604
[45] Date of Patent: Dec. 7, 1993

[54] ARMATURE OF A SMALL MOTOR EMPLOYING AN INSULATING HOLDER HAVING A PLURALITY OF SECTIONS

[75] Inventor: Koichi Katakura, Komagane, Japan

[73] Assignee: Sankyo Seiki Mfg. Co., Ltd., Nagano, Japan

[21] Appl. No.: 900,161

[22] Filed: Jun. 17, 1992

[30] Foreign Application Priority Data

Jun. 18, 1991 [JP] Japan ............................ 3-054387[U]

[51] Int. Cl.$^5$ ............................................ H02K 11/00
[52] U.S. Cl. ...................................... 310/71; 310/214
[58] Field of Search ................ 310/71, 214, 234, 235, 310/239, 242, 249

[56] References Cited

U.S. PATENT DOCUMENTS

| | | | |
|---|---|---|---|
| 4,287,446 | 9/1981 | Lill et al. | 310/71 |
| 4,481,435 | 11/1984 | Loforese | 310/71 |
| 4,765,054 | 8/1988 | Sauerwein et al. | 310/71 X |

Primary Examiner—Steven L. Stephan
Assistant Examiner—Ed To
Attorney, Agent, or Firm—McAulay Fisher Nissen Goldberg & Kiel

[57] ABSTRACT

An improved armature for a small motor comprising a stator core constructed by laminating a plurality of magnetic plates having a plurality of salient poles projecting radially from a ring section, driving coils wound around coil winding sections created on the salient poles, winding slots created at positions where the salient poles adjoin each other and an insulating holder for insulating connecting sections for connecting end wires of the driving coils and lead wires from the driving coils; wherein the insulating holder comprises a plurality of insulating sections created in a manner communicating with each other in the lamination direction of the stator core to be mounted to the slots; holes penetrating through the insulating sections in the lamination direction for inserting the connecting sections and the vicinity thereof and a linking section for linking an end of each of the plurality of insulating sections. The insulating holder having a plurality of insulating sections and the linking section for linking the insulating sections are created in one body, so that a plurality of insulating sections may be created and handled as one part and the size of the insulating holder can be large, thereby facilitating its handling.

6 Claims, 7 Drawing Sheets ative of a small motor and, more particularly, to a connecting structure for connecting an end wire of a driving coil wound around a salient pole of a stator core constructed by laminating a plurality of magnetic plates with a lead wire connected to a driving circuit for driving the small motor.

ARMATURE OF A SMALL MOTOR EMPLOYING AN INSULATING HOLDER HAVING A PLURALITY OF SECTIONS

BACKGROUND OF THE INVENTION

1. Field of the Invention

The present invention relates to an armature of a small motor and, more particularly, to a connecting structure for connecting an end wire of a driving coil wound around a salient pole of a stator core constructed by laminating a plurality of magnetic plates with a lead wire connected to a driving circuit for driving the small motor.

2. Description of the Related Art

Conventionally, a stator core of a small motor is constructed by laminating a plurality of magnetic plates having a plurality of salient poles projecting radially from the peripheral surface of a ring section. An insulating layer is formed on the surface of each of the salient poles of the stator core by coating insulating varnish and driving coils for driving the small motor are wound on the insulating layer of the salient pole. An end wire of each of the driving coils is connected with a lead wire by means of soldering and the like and, through the intermediary of the lead wire, each of the driving coils is connected to an outside driving circuit provided for driving the small motor. Various devices have been developed as the structure for connecting the end wire of the driving coil and the lead wire.

FIGS. 11 and 12 show a prior art example of the connecting structure for connecting an end wire 11 of a driving coil 10 with a lead wire 12.

In FIG. 11, a stator core 2 is constructed by laminating a plurality of ring-shaped magnetic plates 7 having a plurality of salient poles 4 projecting radially from the peripheral surface of a ring section 3. Driving coils 10 are wound respectively around a coil winding section formed on the plurality of salient poles 4; an armature 1 is thus structured.

Each driving coil 10 is sorted into an appropriate number of phases such as three phases of U-phase, V-phase and W-phase and end wires of the driving coils 10 belonging to the same phase are connected in series.

Three end wires at one end of the driving coils 10 (end wires at the winding starting end side, for example) of each of the three phases and one common wire which is what three end wires at the other end (end wires at the winding ending end side, for example) are put together to be common for the three phases, i.e. the total of four wires, are led out as the end wires 11 of the driving coils 10. The lead wires 12 and the end wires 11 are soldered respectively to connect the end wires 11 of both ends of each of the driving coils 10 and the lead wires 12 electrically.

The reference numeral (13) in FIG. 12 denotes a connecting section connected by means of the soldering. The vicinity centered on the connecting section 13 is inserted to an insulating tube 60 to be insulated from the driving coils 10 wound around the coil winding sections of the salient poles 4. As the insulating tube, polyether resin is used for example. The insulating tube 60 is secured in a slot 6 between shade sections 8 of the salient poles 4 by means of press fitting or adhesion.

An adhesive is injected within the insulating tube 60 to rigidly combine the insulating tube 60 and the vicinity centered on the connecting section 13 inserted to the insulating tube 60 or to fix the insulating tube 60 in the slot 6 between the shades 8 of the salient pole 4.

However, because the insulating tubes 60 are small and because all of the insulating tubes 60 have to be treated, it is difficult to complete the assembly. Due to that, sometimes, the insulating tube 60, the end wires 11 of the both ends of the driving coil 10 and the lead wire 12 are not fixed and are treated in a state movable within the insulating tube 60.

According to the prior art connecting method for connecting the end wires 11 of both ends of each of the driving coils 10 and the lead wires 12, the works are carried out by the following steps: pass the lead wire 12 through the insulating tube 60 beforehand; connect the lead wire 12 and the end wire 11 of the driving coil 10 by means of soldering; slide the insulating tube 60 to cover the vicinity centered on the connecting section 13 connected by means of the soldering; and embed the insulating tube 60 into the slot 6 to fix it therein.

However, the prior art method has a disadvantage that it is difficult to complete the assembly steps because, as mentioned above, the insulating tubes 60 are small and also the width of the slots 6 of the small motor is narrow.

Furthermore, the same number of insulating tubes 60 as that of the connecting parts 13 have to be provided and the aforementioned assembly steps have to be carried out on each and every connecting section 13, so that many numbers of small parts are required and the assembly steps become more difficult.

OBJECT AND SUMMARY OF THE INVENTION

Accordingly, it is an object of the present invention to eliminate the aforementioned problems by providing a stator core of a small motor that allows improvement of assembly efficiency for connecting lead wires and end wires of driving coils and for covering connecting sections thereof as well as reducing the number of parts.

According to the present invention, the improved armature for a small motor comprises a stator core constructed by laminating a plurality of magnetic plates having a plurality of salient poles protruding radially from a ring section, driving coils wound around coil winding sections formed on the salient poles, winding slots formed at positions where the salient poles adjoin each other and an insulating holder for insulating connecting sections for connecting end wires of the driving coils and lead wires from the driving coils. The insulating holder comprises a plurality of insulating sections communicating with each other and mounted in the slots of the stator core in the lamination direction, holes penetrating through the insulating sections in the lamination direction for inserting the connecting section and the immediate vicinity thereof and a linking section for linking an end of each of the plurality of insulating sections.

According to the invention, the insulating holder having a plurality of insulating sections and the linking section for linking the insulating sections is created in one body, so that a plurality of insulating sections may be created and handled as a single part and the size of the insulating holder can be large, facilitating its handling.

For a better understanding of the present invention, reference is made to the following description and accompanying drawings while the scope of the invention will be pointed out in the appended claims.

DETAILED DESCRIPTION OF THE PREFERRED EMBODIMENTS

Figure 11:
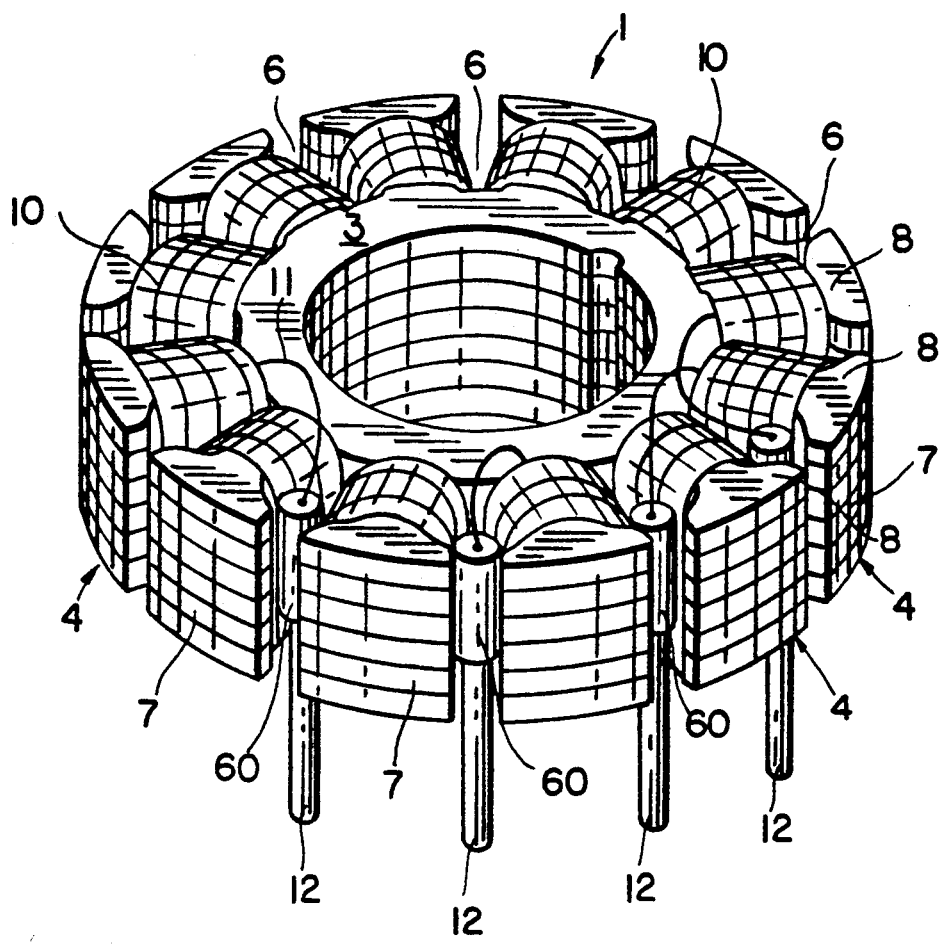
FIG. 11 is a perspective view illustrating a prior art example of a structure of an armature.
Figure 12:
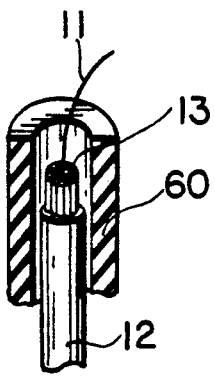
FIG. 12 is a perspective view illustrating a lead wire connecting section in the prior art example in FIG. 11.

Referring now to the drawings, an armature of the present invention will be explained in detail. In the embodiments shown in the drawings, the construction of a stator core 2 and driving coils 10 as an armature 1 are the same as that of the prior art example shown in FIG. 11, so the same reference numerals will be designated for the like or corresponding parts throughout the several views.

Figure 1:
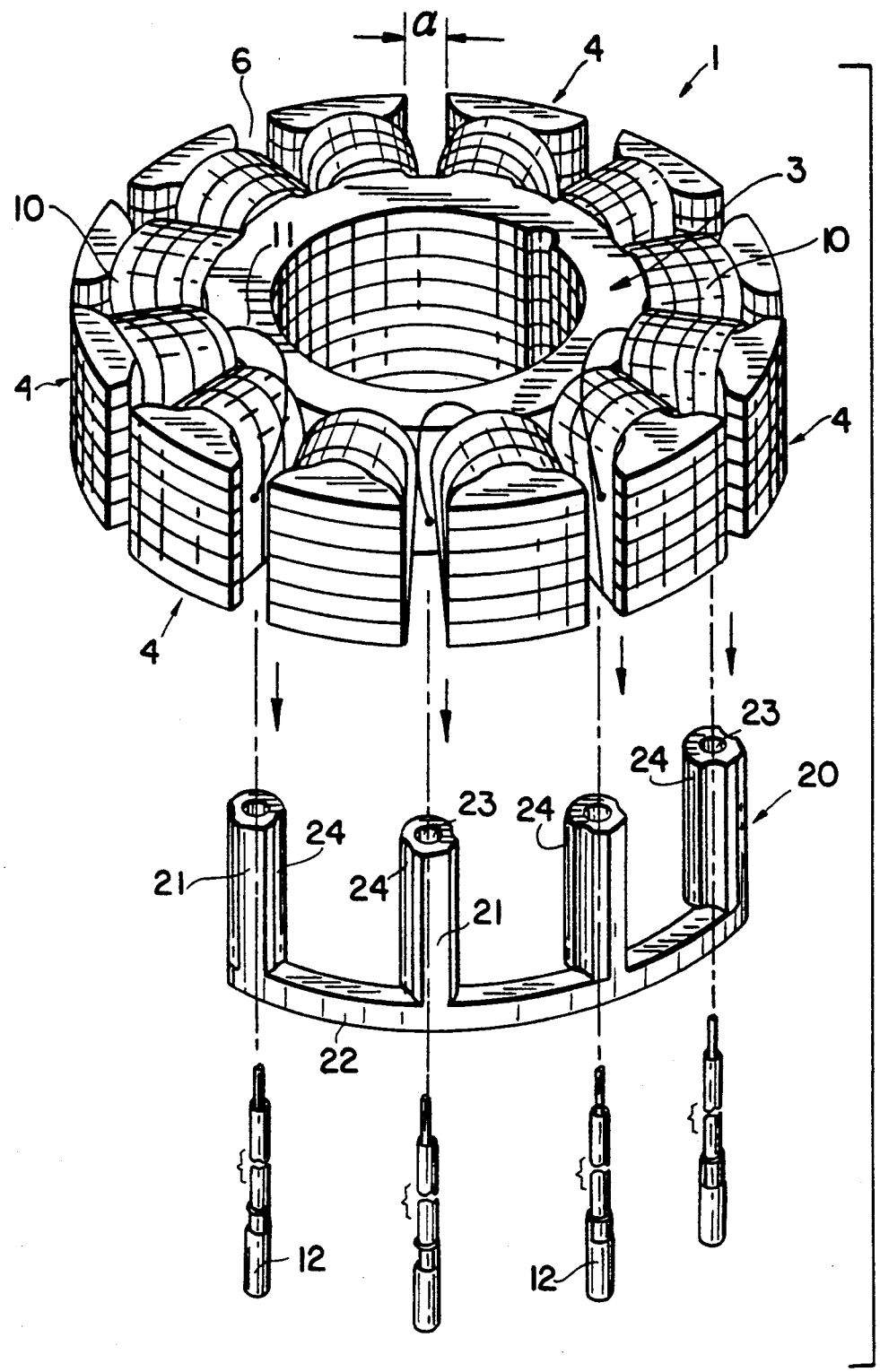
FIG. 1 is a perspective view illustrating one embodiment of an armature of a small motor of the present invention.
Figure 2:
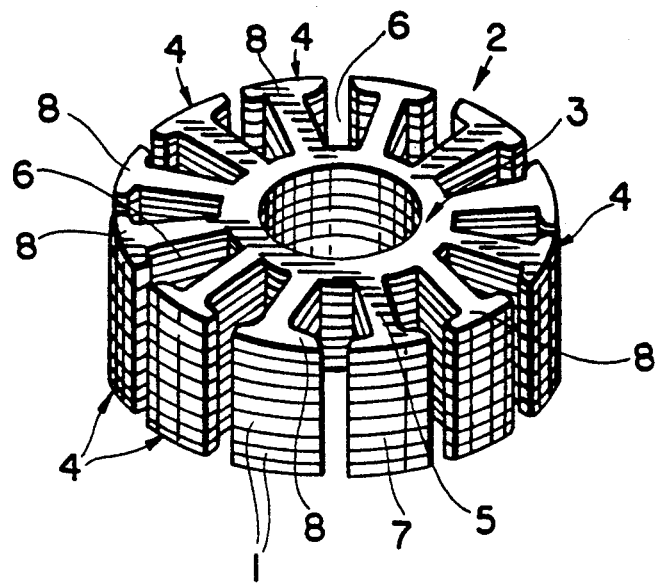
FIG. 2 is a perspective view illustrating a stator core of the armature in FIG. 1.

In FIGS. 1 and 2, the armature 1 comprises the stator core 2 around which the driving coils 10 are wound, the driving coils 10 and an insulating holder 20 of the invention. The stator core 2 is constructed by laminating a plurality of magnetic plates 7 having a plurality of salient poles 4 (12 poles in the embodiment) projecting radially from the peripheral surface of a ring section 3, coil winding sections 5 which are formed on the salient poles 4 for winding the driving coils 10 and winding slots 6 formed at positions where the coil winding sections 5 adjoin each other and by securing by means of caulking by punches or rivets (not shown).

Shade portions 8 which extend in the peripheral direction in shade shape are also formed on the salient poles 4. An insulating layer (not shown) is formed on the surface of the stator core 2 by means of an insulating coating and other means in order to prevent insulation failure of the driving coils 10. The driving coils 10 for driving the small motor are wound around each of the coil winding sections 5 by a certain method. The method for winding the driving coils 10 is determined depending on the driving method, type and characteristics of the small motor used. In the embodiment, the driving coils 10 are sorted into three phases of U-phase, V-phase and W-phase and driving coils 13 belonging to the same phase are connected in series.

Furthermore, in the embodiment, three end wires at one end of the driving coils 10 (end wires at the winding starting end side, for example) for each phase of the three phases and one common wire which is what three end wires at the other end (end wires at the winding ending end side, for example) are put together to be common for the three phases, i.e. the total of four wires, are led out as the end wires 11 of the driving coils 10. Lead wires 12 are soldered to each of those end wires 11 at both ends of the driving coils 10 connected in series to connect the driving coils 10 and the lead wires 12 electrically.

Insulating sections 21 of the insulating holder 20, which will be described below, are secured in the slots 6 between shade portions 8 of the salient poles 4 by an appropriate number of positions (four in the embodiment shown in figure) along the peripheral surface of the salient poles 4 by means of press fitting or adhesion.

Figure 3:
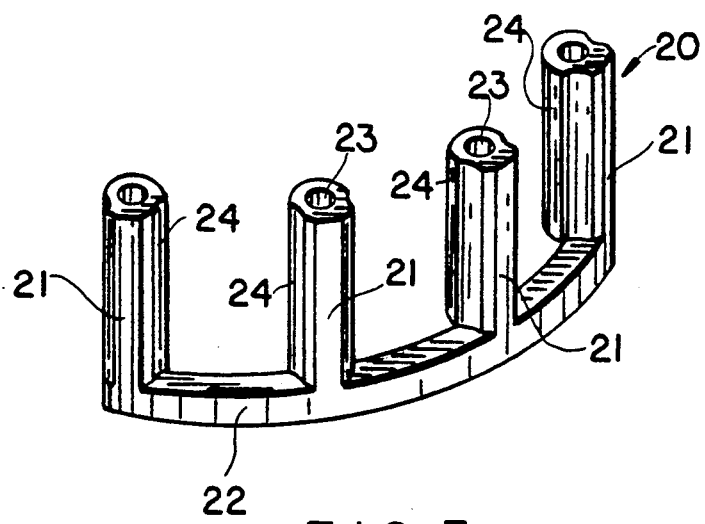
FIG. 3 is a perspective view illustrating an insulating holder of the present invention.
Figure 4:
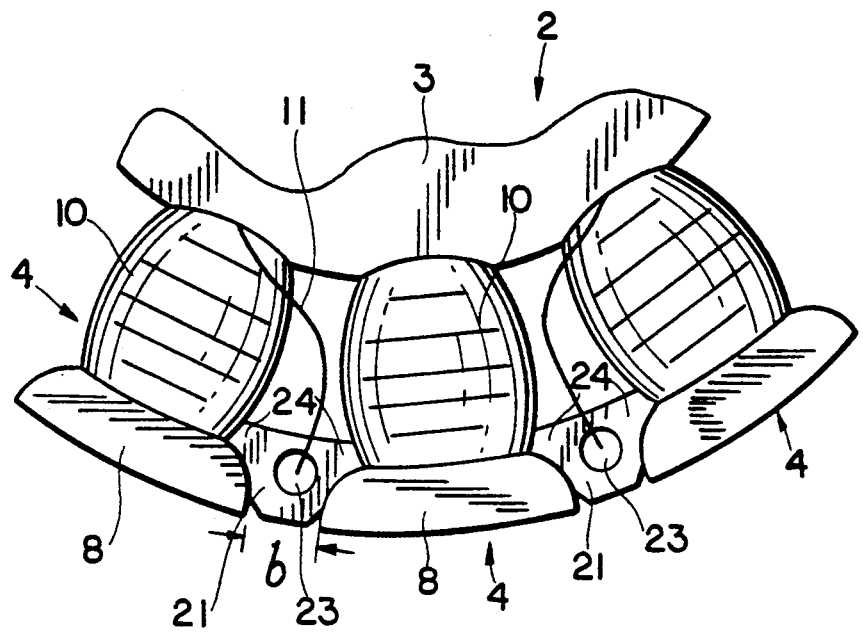
FIG. 4 is a plan view illustrating the insulating holder of the present invention.
Figure 5:
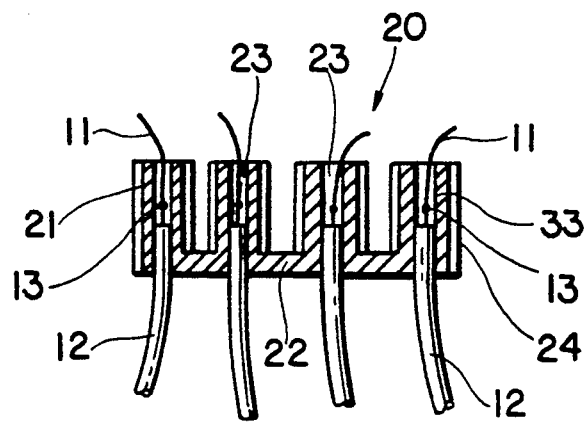
FIG. 5 is a section front view of the insulating holder in FIG. 4.

As shown in FIGS. 3 to 5, the insulating holder 20 comprises the insulating sections 21 for covering the vicinity centered on soldered connecting sections 13 to insulate the solder connecting sections 13 and their vicinity from the driving coils 10, a linking section 22 for linking one end of each of the insulating sections 21 and engaging sections 24 formed on the linking section 22 and the insulating sections 21 for engaging with inner edges of the shade portions 8 of each of the salient poles 4.

The insulating sections 21 are created in columnar shape extending in the lamination direction of the stator core 2 as shown in FIG. 3 and have holes 23 penetrating in the lamination direction of the stator core 2. The size of the holes 23 permits diameters of the end wires 11 of the driving coils 10, the lead wires 12 soldered and the aforementioned connecting section 13 to be sufficiently passed through.

The insulating holder 20 is formed by means of molding using such materials as insulating engineering plastic. The linking section 22 is formed in arc shape along the perimeter of the salient poles 4 of the stator core 2 and is assembled in one body with the salient poles 4 along the perimeter thereof.

Figure 7:
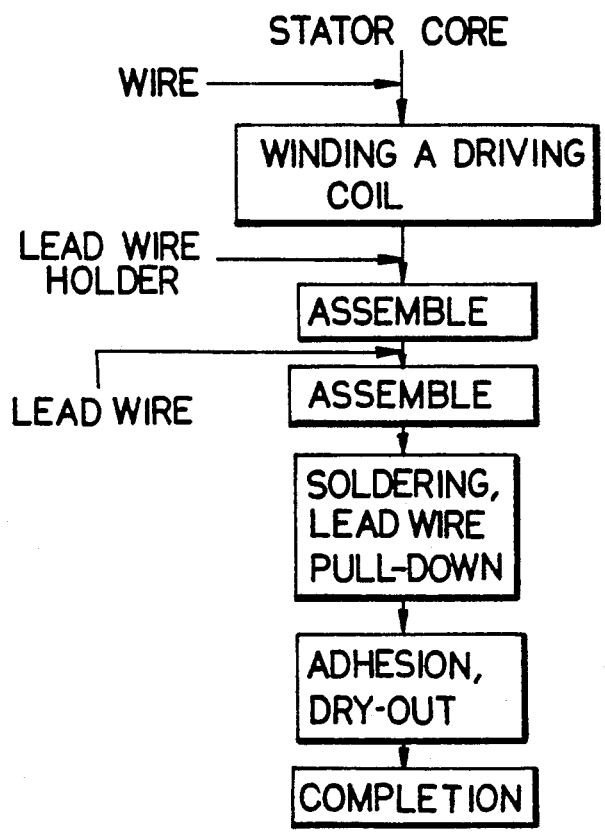
FIG. 7 is a flow chart illustrating an example of the assembling process of the armature of the aforementioned embodiment.

FIG. 7 is a flow chart showing an example of the assembly process of the armature 1 including the work processes described above wherein the stator core 2 is structured by laminating a plurality of magnetic plates 7 having a plurality of salient poles 4 (12 poles in the embodiment) projecting radially from the peripheral surface of the ring section 3, coil winding sections 5 created on the salient poles 4 for winding the driving coils 10 and winding slots 6 created at positions where the coil winding sections 5 adjoin each other and by securing by means of caulking by punches or rivets (not shown).

The insulating layer (not shown) is formed on the surface of the stator core 2 by means of insulating coating and the like to prevent insulation failure of the driving coils 10. A set of cores is thus formed. Wires made of copper are wound around the coil winding sections 5 of the core sets to mount the driving coils 10 on the core sets. Then the insulating holder 20 is assembled. The assembly is carried out by inserting the insulating holder 20 to the slots 6 from the underneath thereof where the coil winding sections 5 of the stator core 2 adjoin each other to dispose each of the insulating sections 21 linked in one body by the linking section 22 in the slots 6 between shade portions 8 of each of the salient poles 4.

Since each of the insulating sections 21 is linked at the lower end thereof by the linking section 22, it is automatically positioned in the vertical direction (direction of a center axial line of the stator core 2) by inserting the linking section 22 until it abuts the lower end surface of the salient poles 4 of the stator core 2. Thereby, the insulating holder 20 will not protrude out of the upper end of the stator core 2 and will not contact with other members provided in the small motor, so that breaking of the driving coils 10 due to the contact may be prevented.

Each of the insulating sections 21 may be also positioned in the radial direction by engaging the engaging sections 24 of each of the insulating sections 21 with the inner edge portions of the shade portions 8 that extend in the peripheral direction in shade shape, or the side edge portions of the driving coils 10, of the salient poles 4 as shown in FIG. 4. Thereby, each of the insulating sections 21 will not jump out of the peripheral surface of the salient poles 4 (the shade portion 8) of the stator core 2, so that it will not contact with a magnet and the like provided at positions facing to the salient poles 4 and no noise or accidents such as breaking wires will be caused during the operation of the small motor. Preferably, the insulating section 21 is formed so that a width b thereof is slightly wider than a width a of the slot 6 in the peripheral direction to be able to secure the insulating section 21 in the slot 6 by means of press fitting. However, the width b may be narrower than the width a when the insulating holder 20 is secured by means of adhesion.

Next, the lead wires 12 connected with the outside driving circuit are assembled by passing through the holes 23 created in the insulating sections 21 of the insulating holder 20. That is, the lead wires 12 are passed through the holes 23 created in the insulating sections 23 from the underneath thereof and the end portions of the lead wires 12 are taken out of the holes 23 once to electrically connect the end portions of the lead wires 12 with the end wires 11 of the driving coils 10 by means of soldering. Sections shown by the reference numeral (13) are connecting sections which are effected by means of the soldering.

After electrically connecting the end portions of the lead wires 12 with the end wires 11 of the driving coils 10 by means of soldering, each of the lead wires 12 is pulled down and the vicinity centered on the connecting section 13 is pulled into the hole 23 of the insulating section 21 as shown in FIG. 5 to accommodate the vicinity centered on the connecting section 13 within the hole 23 of the insulating section 21 to insulate the vicinity centered on the connecting section 13 and the driving coils 10 wound around the coil winding sections 5.

An adhesive may be applied and dried between the hole 23 created in the insulating section 21 and the lead wire 12 to secure the insulating section 21 and the lead wire 12 so that the lead wire 12 will not move. Thus the assembly of the armature 1 can be completed.

Figure 6:
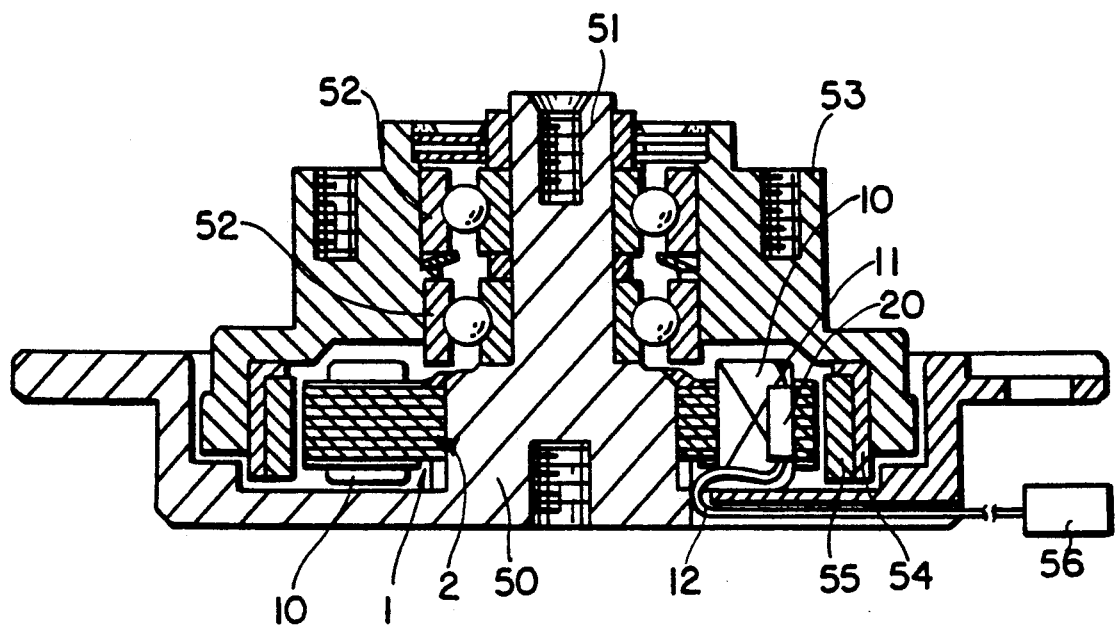
FIG. 6 is a section front view illustrating an example of a small motor using the armature of the aforementioned embodiment.

FIG. 6 shows an example of a small motor using the armature 1 thus obtained. This small motor is constructed as a motor for driving a hard disk. In the figure, the small motor comprises driving coils 10, an insulating holder 20 and others.

Lead wires 12 led out of the armature 1 are pulled out of holes created on the bottom of a frame 50 and are connected with an appropriate driving circuit through the intermediary of a connector 56. A hub base 53 is turnably supported around a center shaft 51 of the frame 50 through the intermediary of a pair of bearings 52 above the armature 1. The lower portion of the hub base 53 has a shape of flat dish laid upside down and a rotor magnet 55 is secured at the inner circumferential side thereof through the intermediary of a yoke 54. The inner circumferential side of the rotor magnet 55 is facing the outer circumferential surface of the salient poles 4 (the shade portions 8) of the stator core 2. The rotor magnet 55 and the hub base 53 assembled in one body with the rotor magnet 55 may be turned and driven by feeding power to each of the driving coils 10 and by switching the feed to each of the driving coils 10 by signaling from the driving circuit based on rotational positions of the rotor magnet 55. A hard disk (not shown) is engaged with and secured on the upper part of the outer circumferential portion of the hub base 53.

Although the insulating holder 20 (i.e. insulating sections 21) is disposed at a position in the slot 6 between the shade portions 8 of the salient poles 4 of the stator core 2 in the aforementioned embodiment since its position is determined in connection with positions where the driving circuit is placed and where the lead wires 12 connected to the driving circuit are led out, it may be disposed at any position other than that so long as the slot 6 is created as the inner circumferential side, i.e., the deep inside portion, of the stator core 2.

Figure 8:
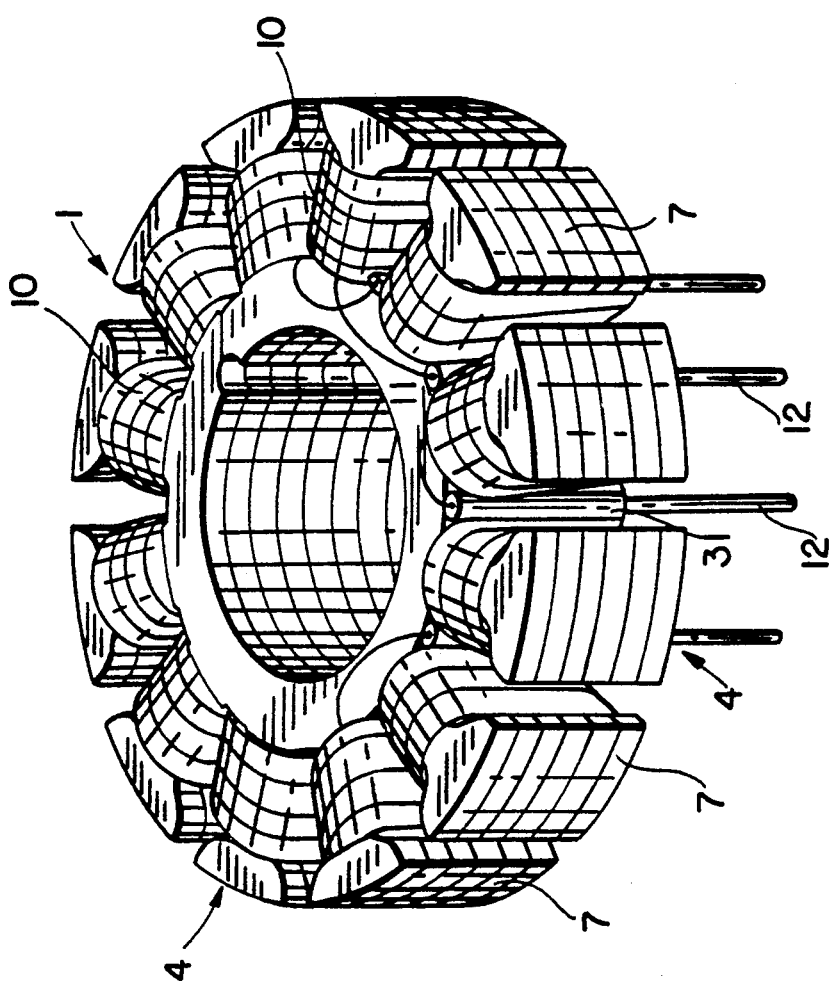
FIG. 8 is a plan view illustrating another embodiment of an armature of a small motor of the present invention.
Figure 9:
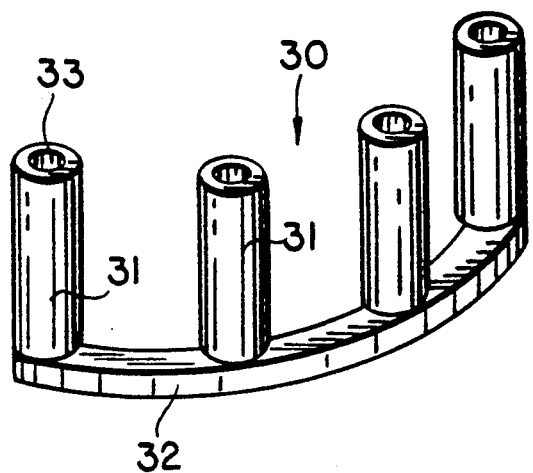
FIG. 9 is a perspective view illustrating an insulating holder in FIG. 8.

An embodiment shown in FIGS. 8 and 9 is an example wherein a plurality of insulating sections 31 are disposed respectively at the deep inside portion of the slot 6, i.e., at the ring section 3 and its vicinity of the stator core 2. Each of the insulating sections 31 is positioned by being set in a limited space partitioned by the deep end of the slot 6, i.e., the side of the ring section 3 of the stator core 2 at the coil winding section 5 side, and the coil winding sections 5 where the driving coils 10 adjoin each other. Then the insulating sections 31 of the insulating holder 30 is secured between the adjoining coil winding sections 5 of the driving coils 10 by means of press fitting. Accordingly, the engaging sections 24 created on the insulating section 21 of the insulating holder 20 are not necessary in the embodiment shown in FIGS. 8 and 9. Each of the insulating sections 31 are linked in one body by a linking section 32 in a manner similar to the aforementioned first embodiment.

It should be noted that the insulating section 31 may be contacted or not contacted with the side of the ring section 3 at the coil winding section 5 side, though the positioning may be accurately carried out when it is contacted with the side of the ring section 3. The other structures are the same as that of the first embodiment.

Figure 10:
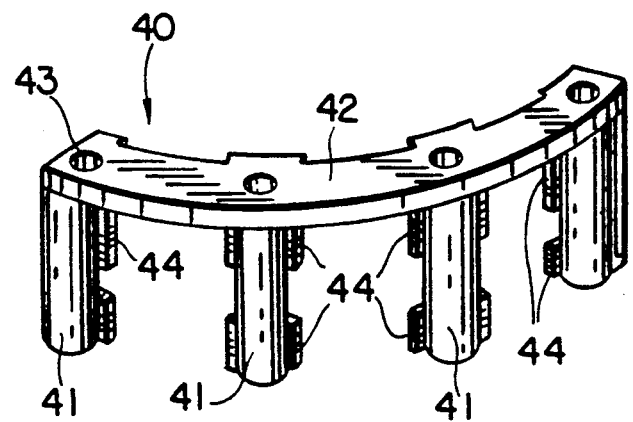
FIG. 10 is a perspective view illustrating another embodiment of an insulating holder of the present invention.

Furthermore, each of the insulating sections may be positioned at the opposite side of the linking section differing from the case of the aforementioned embodiments as shown in FIG. 10. That is, in an insulating holder 40 shown in FIG. 10, the linking section 41 links the upper end portions of each of the insulating sections 41. Engaging sections 44 formed on the insulating sections 41 for engaging with the inner edges of the shade portions 8 of each of the salient poles 4 are created only partly in the vertical direction. That is, the engaging sections 44 will do if they engage with the inner edge portion of the salient poles 4 and are positioned in the radial direction.

According to the present invention, the insulating holder having a plurality of insulating sections and the linking section for linking the insulating sections in one body is created, so that a plurality of insulating sections may be created and handled as one part and the size of the insulating holder can be large, facilitating its handling.

Furthermore, the insulating holder is disposed in the slots of the stator core on which the driving coil is wound, so that a plurality of insulating sections may be disposed as one part at one particular time of the mounting operation, thereby improving the efficiency of the assembly work.

Still further, an insulating holder having a plurality of insulating sections created in one body may be handled as one part, so that the number of parts may be reduced.

While the foregoing description and drawings represent the preferred embodiments of the present invention, it will be obvious to those skilled in the art that various changes and modifications may be made therein without departing from the true spirit and scope of the present invention.

What is claimed is:

1. An improved armature for a small motor comprising:
    a stator core formed by a lamination of a plurality of magnetic plates having a plurality of salient poles projecting radially from a ring section, said salient poles having shade portions;
    driving coils wound around coil winding sections created on said salient poles;
    winding slots created at positions where said salient poles adjoin each other;
    an insulating holder for insulating connecting sections for connecting end wires of said driving coils and lead wires from said driving coils, wherein said insulating holder comprises:
    a plurality of insulating sections communicating with each other and mounted in said slots of said stator core in lamination direction;
    said insulating sections having holes penetrating therethrough in lamination direction for receiving said connecting sections and their immediate vicinity inserted therein, said insulating sections having engaging sections for engaging with an edge portion of said shade portions of said salient poles on the driving coil side; and
    and a linking section for linking an end of each of said plurality of insulating sections.

2. The armature of a small motor according to claim 1, wherein said insulating sections of said insulating holder are disposed in said winding slots between shade portions of said salient poles.

3. The armature of a small motor according to claim 1, wherein said insulating sections of said insulating holder are created so that a width thereof is wider than a width between said shade portions of said salient poles in said slot.

4. The armature of a small motor according to claim 1, wherein each said insulating section of said insulating holder is disposed in a space bound by a side of said ring section at the coil winding section side and said coil winding sections adjoining each other.

5. An improved armature for a small motor comprising:
    a laminated stator core having a plurality of radially projecting salient poles, said salient poles adjoining at winding slots, said salient poles having shade portions;
    driving coils wound on said salient poles, said driving coils having end wires and lead wires which are connected at connecting sections; and
    an insulating holder for insulating said connecting sections, said insulating holder including a plurality of insulating sections extending within said winding slots in a lamination direction, each said insulating section having a hole therethrough in said lamination direction for holding and insulating said connecting sections and their adjacent vicinity; said insulating holder also including a linking section for linking a corresponding one of each insulating section said insulating sections having engaging sections for engaging with an edge portion of said shade portions of said salient poles on the driving coil side.

6. The improved armature of claim 5 wherein said insulating sections are generally tubular in shape and said linking section is generally ring-like in shape.

* * * * *